Patented Sept. 9, 1941

2,255,107

UNITED STATES PATENT OFFICE 2,255,107

MANUFACTURE OF PURE SODIUM CYANIDE

Reinhold Fick and Karl Wintersberger, Ludwigshafen-on-the-Rhine, Germany, assignors, by mesne assignments, to Walter H. Duisberg, New York, N. Y.

No Drawing. Application November 18, 1937, Serial No. 175,254. In Germany December 17, 1936

5 Claims. (Cl. 23—84)

The present invention relates to improvements in the manufacture of pure sodium cyanide by recovering from crude materials which contain the said salt.

For the purpose of recovering pure sodium cyanide from solid masses or solutions containing other substances in addition to sodium cyanide, it has already been proposed to separate the impurities by lixiviating the sodium cyanide with aqueous ammonia or to precipitate the impurities in an insoluble form by treating the solutions with ammonia gas. The filtrate freed from the impurities is then worked up, after distilling off the ammonia, into solid sodium cyanide by evaporation, preferably under reduced pressure. By reason of the fact that a decomposition of the cyanide always occurs during the evaporation and that a complete separation of certain impurities, such as sodium formate, is not always obtained by the said ammonia treatment, the products obtained do not satisfy all the requirements as regards their purity.

We have now found that it is possible to obtain the cyanide in a state of high purity from solutions containing other salts in addition to sodium cyanide without having to resort to any appreciable evaporation of water with its attendant decomposition of cyanide, by precipitating sodium cyanide containing water of crystallization from the ammoniacal solution by the removal of ammonia, the sodium cyanide then being separated from the aqueous mother liquor. In this way the greater part of the sodium cyanide dissolved in the ammoniacal water can be caused to precipitate, while the impurities remain in solution. Care should be taken that in the removal of the ammonia the solution is not heated to temperatures about about 40° C.

The removal of the ammonia may be effected for example by leading through gases inert to the cyanide solution, such as air free from carbon dioxide. It is especially advantageous to expel the ammonia from the solution by the action of reduced pressure with or without the simultaneous leading through of gases, because in this way a cooling of the solution is caused and the separation of the cyanide thereby completed. This effect may be still further favored by the use of heat-insulating vessels.

It is advantageous to start with ammoniacal solutions which are saturated as far as possible with sodium cyanide, but cyanide solutions having a cyanide content of about 30 per cent may also be worked up in a satisfactory manner.

According to this invention solutions having a content of ammonia of only a few per cent may also be successfully worked up; generally speaking, however, the process is more efficient with higher concentrations of ammonia.

The products obtained in the said manner consists mainly of the dihydrate $NaCN.2H_2O$. It may be converted without decomposition into anhydrous sodium cyanide in known manner. However, this may be effected especially suitably in the following manner: By treating the hydrate with gaseous or liquid ammonia, the mass while undergoing a slight decrease of temperature is converted into a pulp consisting of anhydrous sodium cyanide and a saturated ammoniacal aqueous solution of sodium cyanide which may be separated from each other. The amount of separated anhydrous salt amounts to from about 50 to 55 per cent of the sodium cyanide contained in the hydrate used. The ammoniacal sodium cyanide solution may be returned to the process. This method of dehydration has the considerable advantage that heating of any kind is avoided.

The following examples will further illustrate the nature of this invention but the invention is not restricted to these examples.

Example 1

By lixiviation of a mass containing sodium cyanide with aqueous ammonia there is obtained a solution containing 38.4 per cent of NaCN, 1.1 per cent of $Na_2CO_3$, 1.0 per cent of NaCl, 0.9 per cent of NaOH, 0.5 per cent of HCOONa and 5 per cent of $NH_3$ and the remainder water. By bubbling air free from carbon dioxide through the solution, the ammonia is removed therefrom. With a final temperature of the solution of 17° C., 34 per cent of the total cyanide present in the solution crystallizes as $NaCN.2H_2O$. The crystals are centrifuged off and dried in vacuo. The resulting product contains 97.2 per cent of NaCN, 0.6 per cent of HCOONa, 0.3 per cent of $Na_2CO_3$ and 1.3 per cent of NaCl.

If the ammonia be removed from the solution by means of a vacuum, the final vacuum amounting to from 10 to 15 millimetres (mercury gauge), the temperature falls from 21° to 2° C. The yield then amounts to 55 per cent of the cyanide present, the purity of the dried product being as stated above.

Example 2

From a solution containing 38.6 per cent of NaCN, 1 per cent of NaOH, 0.15 per cent of $Na_2CO_3$, 1.0 per cent of HCOONa and 15 per cent of $NH_3$ and the remainder water, the ammonia is pumped off under a pressure of 10 millimetres (mercury gauge). The temperature thus falls from 22° C. to 10° below zero C. 76.4 per cent of the sodium cyanide present crystallizes out from the solution. The dried salt contains 98.45 per cent of NaCN, 0.48 per cent of HCOONa and 0.81 per cent of $Na_2CO_3$.

What we claim is:

1. A process of producing pure sodium cyanide from ammoniacal aqueous solutions of sodium cyanide with a content of sodium cyanide of at least about 30 per cent which consists in removing ammonia from the solution and avoiding a substantial evaporation of water while maintaining a temperature not exceeding about 40° C., a precipitation of solid sodium cyanide containing water of crystallization thus taking place, and then separating the precipitated sodium cyanide from the mother liquor.

2. A process of producing pure sodium cyanide from ammoniacal aqueous solutions of sodium cyanide with a content of sodium cyanide of at least about 30 per cent which consists in leading gases inert to the solution through the latter while maintaining a temperature not exceeding about 40° C., in order to remove ammonia from the solution and to precipitate solid sodium cyanide containing water of crystallization, and then separating the precipitated sodium cyanide from the mother liquor.

3. A process of producing pure sodium cyanide from ammoniacal aqueous solutions of sodium cyanide with a content of sodium cyanide of at least about 30 per cent which consists in pumping off ammonia from the solution and avoiding a substantial evaporation of water while maintaining a temperature not exceeding about 40° C., a precipitation of solid sodium cyanide containing water of crystallization thus taking place, and then separating the precipitated sodium cyanide from the mother liquor.

4. A process of producing pure sodium cyanide from ammoniacal aqueous solutions of sodium cyanide with a content of sodium cyanide of at least about 30 per cent which consists in expelling ammonia but no substantial amounts of water out of the solution in order to precipitate solid sodium cyanide containing water of crystallization, while maintaining a temperature not exceeding about 40° C. and utilizing the decrease of temperature caused by expelling the ammonia, for the completion of the crystallization by using heat-insulating vessels, and then separating the precipitated sodium cyanide from the mother liquor.

5. A process of producing pure sodium cyanide from ammoniacal aqueous solutions of sodium cyanide with a content of sodium cyanide of at least about 30 per cent which consists in removing ammonia from the solution while maintaining a temperature not exceeding about 40° C., a precipitation of solid sodium cyanide containing water of crystallization thus taking place, then separating the precipitated sodium cyanide from the mother liquor, acting upon the separated sodium cyanide hydrate with ammonia to form anhydrous sodium cyanide and an ammoniacal aqueous solution of sodium cyanide and returning the latter to the process.

REINHOLD FICK.
KARL WINTERSBERGER.